(12) United States Patent
Chan et al.

(10) Patent No.: US 6,635,866 B2
(45) Date of Patent: Oct. 21, 2003

(54) MULTI-FUNCTIONAL FIBER OPTIC COUPLER

(75) Inventors: Benson Chan, Vestal, NY (US);
Richard R. Hall, Endwell, NY (US);
How T. Lin, Vestal, NY (US); John H. Sherman, Lisle, NY (US)

(73) Assignee: Internation Business Machines Corporation, Armonk, NY (US)

( * ) Notice: Subject to any disclaimer, the term of this patent is extended or adjusted under 35 U.S.C. 154(b) by 227 days.

(21) Appl. No.: 09/838,645

(22) Filed: Apr. 19, 2001

(65) Prior Publication Data

US 2002/0154869 A1 Oct. 24, 2002

(51) Int. Cl.[7] ................................................. H01J 5/02
(52) U.S. Cl. ...................................................... 250/239
(58) Field of Search ............................. 250/239, 227.11, 250/214 R, 216; 385/92, 98, 89, 58, 69, 70, 83

(56) References Cited

U.S. PATENT DOCUMENTS

| | | | |
|---|---|---|---|
| 4,625,333 A | 11/1986 | Takezawa et al. | 455/612 |
| 5,005,939 A | 4/1991 | Arvanitakis et al. | 350/96.2 |
| 5,109,454 A | 4/1992 | Okuno et al. | 385/92 |
| 5,123,074 A | 6/1992 | Yokota et al. | 385/95 |
| 5,241,614 A | 8/1993 | Ecker et al. | 385/94 |
| 5,475,778 A | 12/1995 | Webb | 385/31 |
| 5,515,468 A | 5/1996 | DeAndrea et al. | 385/88 |
| 5,535,296 A | 7/1996 | Uchida | 385/89 |
| 5,604,831 A | 2/1997 | Dittman et al. | 385/88 |
| 5,687,267 A | 11/1997 | Uchida | 385/89 |
| 5,781,682 A | 7/1998 | Cohen et al. | 385/89 |
| 6,203,212 B1 * | 3/2001 | Rosenberg et al. | 385/92 |
| 6,456,766 B1 * | 9/2002 | Shaw et al. | 385/47 |

* cited by examiner

*Primary Examiner*—Que T. Le
(74) *Attorney, Agent, or Firm*—Lawrence R. Fraley; Arthur J. Samodovitz

(57) ABSTRACT

An optical coupler that provides for the direct mounting of integrated circuit(s). The coupler includes a two-part housing with grooves for accommodating optical fibers that are held in place when the two parts are put together. Circuitry is formed on the housing and solder balls, when heated to a liquid state and cooled (reflowed), are used to attach integrated circuit(s) onto the housing. At least one of these integrated circuit(s) is an optical die that is positioned in close proximity to the optical fibers to provide for the receipt and/or transmission of optical signals. The reflowing of the solder balls forms an electrical connection between the circuitry on the housing and the integrated circuit(s) and provides for alignment of these components. The housing is attached to a circuitized substrate using reflowed solder balls or wirebonds.

23 Claims, 8 Drawing Sheets

MULTI-FUNCTIONAL FIBER OPTIC COUPLER

TECHNICAL FIELD

The invention relates to fiber optic coupling devices such as those used in networking and telecommunications equipment. More particularly, the invention relates to coupling devices that provide an imbedded capability to receive optical signals and convert these signals to electrical signals and/or receive electrical signals and convert said signals for transmission as optical signals.

BACKGROUND OF THE INVENTION

As is known, the use of optical fiber has gained wide acceptance for use in such applications as telecommunications, networking, computing and general electronics. This is due to its numerous advantages including a relatively low cost of manufacture, excellent mechanical reliability and EMI (Electro-Magnetic Interference) characteristics and most importantly, that it provides a significant increase in information transmission bandwidth over copper wire. To make effective use of optical fiber, devices for the transmission, re-transmission and receipt of signals are used. These devices have taken many forms, but have traditionally consisted of a component which secures and aligns the optical fibers with a laser or other light-emitting device for the transmission of signals and/or an optical sensor for the receipt of signals. Signals to be transmitted typically are converted from an electrical signal generated by another device into an optical signal. Conversely, received optical signals are converted into electrical signals for processing by other electronic devices. Traditionally, this conversion of signals has been performed by an electronic component which is physically separate from that which secures and aligns the optical fibers.

However, given current trends toward miniaturization and lowering the power consumption of electronic components, it is understandable that, whenever possible, components must perform multiple functions. The present invention achieves these goals of miniaturization and having components with multiple functions by forming circuitry on the components which secure and align the optical fibers such that electronic devices (e.g. integrated circuits) can be mounted directly on these components and can be electrically connected to them. There are several known methods and apparatus for coupling optical fibers as described in the following U.S. Letters Patents:

U.S. Pat. No. 4,625,333—Takezawa et al
U.S. Pat. No. 5,005,939—Arvanitakis et al
U.S. Pat. No. 5,109,454—Okuno et al
U.S. Pat. No. 5,123,074—Yokota et al
U.S. Pat. No. 5,241,614—Ecker et al
U.S. Pat. No. 5,475,778—Webb
U.S. Pat. No. 5,515,468—DeAndrea et al
U.S. Pat. No. 5,535,296—Uchida
U.S. Pat. No. 5,604,831—Dittman et al
U.S. Pat. No. 5,687,267—Uchida
U.S. Pat. No. 5,781,682—Cohen et al U.S. Pat. No. 4,625,333 describes a device whereby lenses are utilized to focus the light from a light-emitting module onto a transmission optical fiber, and from a reception optical fiber onto a light receiving element. This device is directed toward providing support for a single transmission optical fiber, and a single reception optical fiber.

U.S. Pat. No. 5,005,939 is assigned to the same assignee as the present invention and is incorporated herein by reference. U.S. Pat. No. 5,005,939 describes an assembly in which optical fibers are aligned with a pair of opto-electronic devices. One of the opto-electronic devices acts as a transmitter and the other as a receiver. The opto-electronic devices are electrically connected to semiconductor chips which reside on a ceramic substrate that is separate and distinct from the opto-electronic devices.

U.S. Pat. No. 5,109,454 describes an apparatus for light communication in which photo-connector receptacles containing optical elements are electrically connected to peripheral circuits. The peripheral circuits and the optical elements are mounted on separate and distinct surfaces. The peripheral circuits are electrically connected to terminals which can be used to form an electrical connection to a circuit that is external to the apparatus. The preferred embodiment of the apparatus describes two (2) photo-connector receptacles.

U.S. Pat. No. 5,123,074 describes an insulating substrate with electrical circuits formed on a surface thereof that is adapted for having optical and electric circuit components mounted thereon. U.S. Pat. No. 5,123,074 describes the substrate and a method for manufacturing same.

U.S. Pat. No. 5,241,614 is assigned to the same assignee as the present invention and is incorporated herein by reference. U.S. Pat. No. 5,241,614 describes an optical fiber interface and a method for manufacturing same. The optical fiber interface utilizes a block with V-grooves to secure optical fibers and align these with a detector on a receiver chip as well as a coupling lens which is aligned with a laser chip located on an optical transmitter carrier. Both the detector on the receiver chip as well as the coupling lens and laser chip on the optical transmitter carrier are oriented at right angles to the axes of the optical fibers with which these are aligned. The ends of the optical fibers are ground at an angle and metalized to produce angled fiber end faces. The angled fiber end faces reflect light and establish optical connectivity between the optical fibers and both the detector and the coupling lens.

U.S. Pat. No. 5,475,778 describes a connector that sends and receives optical signals over optical fibers. This connector has a transducer which converts incoming optical signals to electrical signals as well as an additional, independent transducer which converts outgoing electrical signals to optical signals. Both transducers are electrically connected to a microprocessor, which is in turn electrically connected to a surface mount device which contains circuitry that is required for the functioning of the connector. Collectively, the microprocessor and the surface mount device comprise an electrical processing circuit for processing the electrical signals associated with the transmitted and received optical signals. The transducers, the microprocessor, and the surface mount device are all mounted on a common substrate.

U.S. Pat. No. 5,515,468 describes a device that optically connects a fiber optic transmission line to an opto-electronic device mounted on a substrate. The light transmission axis of the fiber optic transmission line is substantially not coincidental with the operative axis of the opto-electronic device. Consequently, a light bending sub-component, comprised of lenses and a reflecting surface, is required to optically connect the fiber optic transmission line to the opto-electronic device. The preferred embodiment of this device describes both a simplex and a duplex embodiment. The simplex embodiment provides support for a single fiber optic transmission line, and the duplex embodiment provides support for two (2) fiber optic transmission lines.

U.S. Pat. No. 5,535,296 describes a mounting assembly that supports optical fibers between a grooved substrate and a clamping substrate. The optical fibers are aligned with an opto-electronic device (e.g. a laser diode) that is mounted on a substrate which is separate and distinct from both the grooved substrate and the clamping substrate. Alignment between the optical fibers and the opto-electronic device is achieved through the use of pre-set reference marks on the substrate to which the opto-electronic device is attached. The mounting assembly can be configured to contain either a photodetector receiver array or an edge emitting laser diode transmitter array.

U.S. Pat. No. 5,687,267 is a continuation of U.S. Pat. No. 5,535,296, but is instead directed to an optoelectronic package.

U.S. Pat. No. 5,604,831 is assigned to the same assignee as the present invention and is incorporated herein by reference. U.S. Pat. No. 5,604,831 describes an optical module with flexible circuit boards that are used to electrically connect optical transceiver sub-assemblies to electronic circuits on a separate and distinct ceramic substrate within the module. The flexible circuit boards are soldered to the electronic circuits on the ceramic substrate using a fluxless solder in an atmosphere of formic acid mixed with nitrogen. Solder reflow is performed using a laser.

U.S. Pat. No. 5,781,682 is assigned to the same assignee, among others, as the present invention and is incorporated herein by reference. U.S. Pat. No. 5,781,682 describes an optical coupling apparatus for attaching a connector at the end of an optical cable to a receiver or transmitter array contained within a connector shell. The optical cable, the connector at its end, and the receiver or transmitter array within the connector shell are all provided in a parallel format such that multiple optical connections can be established. Optical fibers in the optical cable and active elements of the receiver or transmitter array are at right angles to each other. Optical connectivity between the optical fibers and the active elements is realized through the use of an array of reflecting fins so as to effect a 90 degree bend in the light path. The ends of the optical fibers and the reflecting fins are contained in the connector which is separate from the connector shell that contains the receiver or transmitter array. A connector shell can be configured to contain either a receiver or a transmitter array.

It is believed, therefore, that an optical coupler which provides the many advantages taught herein would constitute a significant advancement in the art.

OBJECT AND SUMMARY OF THE INVENTION

It is a primary object of the present invention to provide an optical coupler that is of simplified construction compared to many known devices.

It is another object of the invention to provide an optical coupler that has a reduced cost of manufacture.

It is yet another object of the invention to provide an optical coupler of miniaturized construction compared to many known couplers.

It is yet another object of the invention to provide an optical coupler that consumes relatively less electrical power than many known such couplers.

It is yet another object of the invention to provide an optical coupler with improved performance.

In accordance with one embodiment of the invention, there is provided an optical coupler which comprises a housing for positioning at least one optical fiber having an axis within the housing, circuitry positioned on or within the housing, an integrated circuit positioned on or within the housing that is electrically connected to the circuitry on or within the housing using a plurality of electrical conductors and aligned with the axis of the at least one optical fiber having an axis within the housing.

In accordance with another embodiment of the invention, there is provided a method for making an optical coupler wherein the method comprises the steps of providing a housing, positioning at least one optical fiber having an axis within the housing, forming circuitry on or within the housing, positioning a plurality of electrical conductors on an integrated circuit and positioning the plurality of electrical conductors and the integrated circuit on or within the housing such that the integrated circuit is electrically connected to the circuitry on or within the housing and aligned with the axis of the at least one optical fiber having an axis within the housing.

BEST MODE FOR CARRYING OUT THE INVENTION

Figure 1:
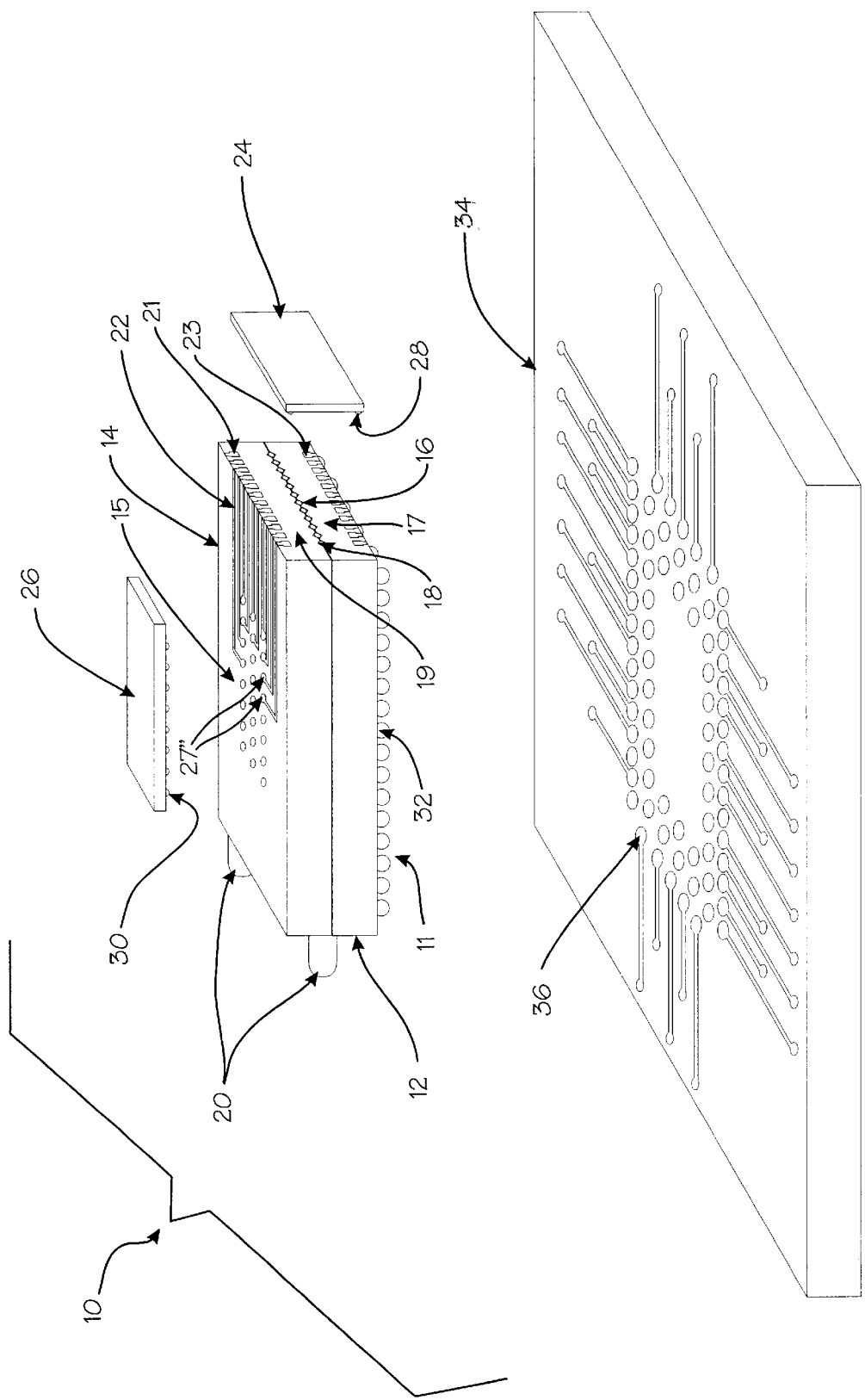
FIG. 1 is an exploded perspective view of an optical coupler according to one embodiment of the invention.

For a better understanding of the present invention, together with other and further objects, advantages and capabilities thereof, reference is made to the following disclosure and appended claims in connection with the above described drawings.

The optical coupler housing which is described herein may be comprised of any crystalline semi-conducting material. Some examples of materials that might be used for this purpose include: silicon, thermoplastic, ceramic, germanium, gallium arsenide, combinations of the foregoing, or any other equivalent material.

The driver die which is described herein is typically an integrated circuit that is used for the purpose of converting analog signals to digital signals and/or digital signals to analog signals. However, the driver die could also be a micro-processor, or an ASIC (Application Specific Integrated Circuit) that is used for another purpose.

The close proximity of the integrated circuits on the optical coupler housing serves to minimize processing delays during operation as well as to minimize any electro-magnetic noise to which these integrated circuits and their ancillary circuitry might be exposed.

It is understood that like numerals will be used to indicate like elements from FIGURE to FIGURE in the drawings which are described infra.

In FIG. 1, there is shown an embodiment of an optical coupler 10 according to one aspect of the invention. Coupler 10 comprises a housing 11 for positioning at least one optical fiber 18 within housing 11, circuitry 21 and 23 formed on or within housing 11, and at least one integrated circuit 24 positioned on or within housing 11 that is electrically connected to circuitry 21 and 23 on or within housing 11 using a plurality of first electrical conductors 28. Optical fiber 18 is aligned relative to integrated circuit 24. Housing 11 comprises a first part 12 and a second part 14. At least first part 12 of housing 11 has at least one groove 16 and preferably also includes alignment pin grooves 126 (shown in FIG. 8) formed on it using, in one example, chemical machining.

Figure 8:
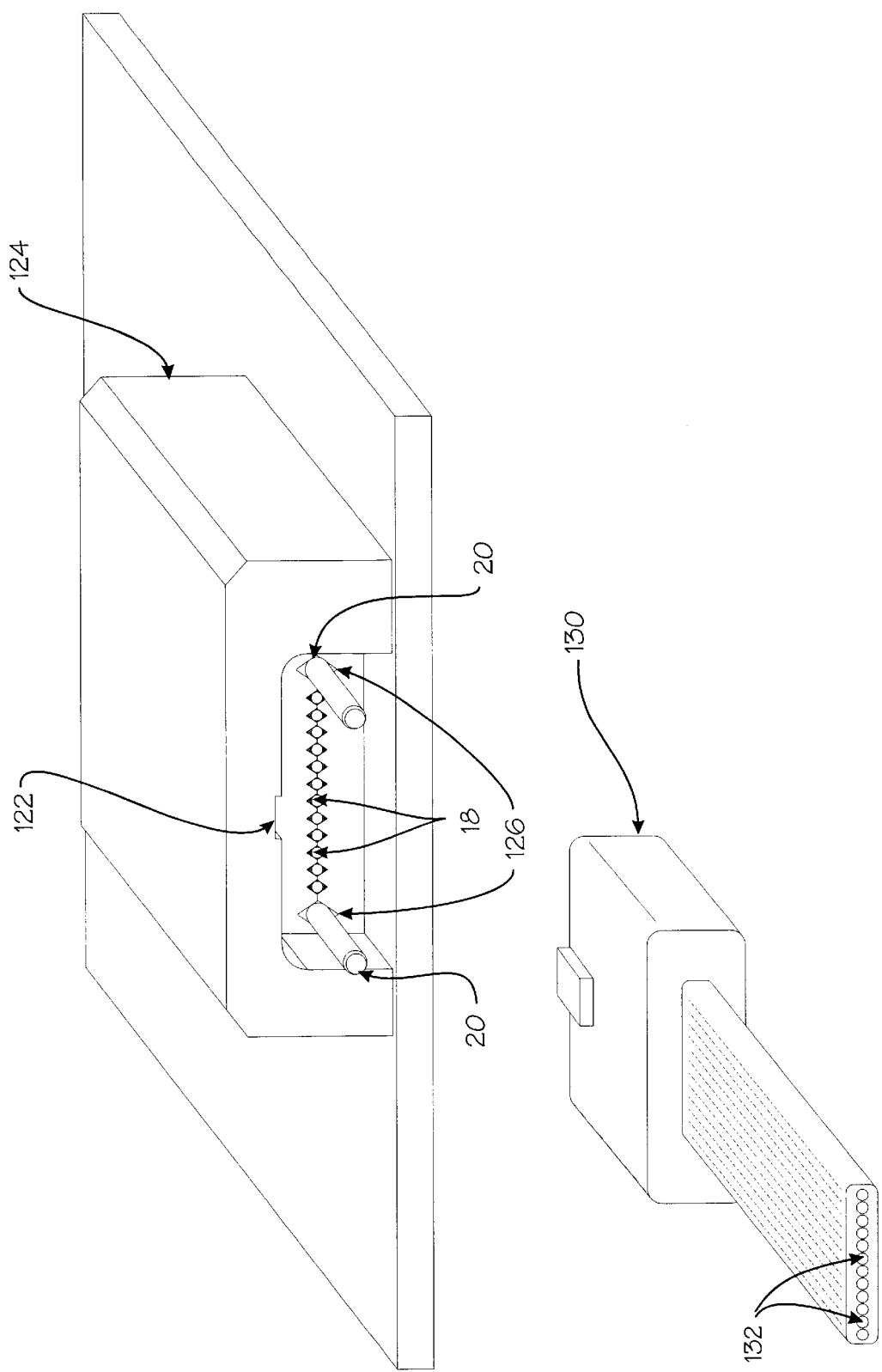
FIG. 8 is a perspective view of an assembled optical coupler on a substrate including a cover member thereon.

Circuitry 23 is formed on first end surface 17 and circuitry 21 is formed on second end surface 19 using, in one example, a doping process. A doping process comprises imbedding ions into a surface to form circuitry, and is a known process. Further description is not believed needed. Circuitry 25 and 22, if used (see below), are formed on first opposing surface 13 and second opposing surface 15, respectively, of parts 12 and 14, using, in one example, a doping process as mentioned above (13 and 25 are shown in FIG. 3—Note that the housing in FIG. 3 is inverted with respect to FIGS. 1 and 2). Circuitry 25 on first opposing surface 13 includes large circuit pads 27 and small circuit pads 27' (shown in FIG. 3). Circuitry 22 on second opposing surface 15 also includes small circuit pads 27". Circuitry 25, circuit pads 27 and 27' and circuitry 23 are electrically connected. As seen, circuitry 22 and 21 and pads 27" are also electrically connected (see FIGS. 1 and 2). First opposing surface 13 and second opposing surface 15 are substantially planar. Optical fiber 18 is placed in a respective groove 16, and alignment pins 20 are placed in alignment pin grooves 126 (FIG. 8). Second part 14 of housing 11 is placed on first part 12 to secure and align optical fiber 18 and alignment pins 20. There is at least one optical fiber 18 and respective groove 16, however there can be as many optical fibers and respective grooves as can be accommodated by the width of housing 11. In one example, there may be between about one (1) and twenty (20) optical fibers and respective grooves. First part 12 and second part 14 are preferably held together using an adhesive (not shown).

The plurality of first electrical conductors 28 are placed on integrated circuit 24, in one example an optical die that is substantially planar, which contains at least one light-sensing and/or light-emitting area 110 (shown in FIG. 7) on one of its faces. In one example, there may be between about one (1) and twenty (20) light-sensing and/or light-emitting areas. Electrical conductors 28 are, in one example, solder balls comprised of about 10% tin and 90% lead by weight, and have a relatively high melting point temperature. Integrated circuit 24 contains circuit pads 112 (shown in FIG. 7) to receive electrical conductors 28. In a preferred embodiment, electrical conductors 28 are applied to integrated circuit 24 by using a mask that exposes circuit pads 112 and screening solder paste onto the circuit pads. Circuit pads 112 correspond to circuitry 23 on first end surface 17 and circuitry 21 on second end surface 19. Using flip-chip soldering technology, electrical conductors 28 are reflowed (heated to a substantially liquid state and thereafter cooled to a substantially solid state) and integrated circuit 24 is passively aligned relative to optical fibers 18 and electrically connected to circuitry 21 and 23. Flip-chip soldering technology comprises a method whereby an integrated circuit has electrical conductors, in one example solder balls, placed on exposed circuitry. The integrated circuit is then flipped over and the electrical conductors are reflowed so as to electrically connect the integrated circuit to another electrically conductive member, in one example a circuitized substrate. Flip-chip soldering technology is known, and further description is not believed needed. After soldering has been performed, the axes of optical fibers 18 are aligned such that these are substantially perpendicular to integrated circuit 24. A plurality of second electrical conductors 32 (FIGS. 1 and 2) are placed on circuit pads 27 on first opposing surface 13 and electrically connect circuit pads 27 to circuitry 36 on circuitized substrate 34 (see below). The plurality of second electrical conductors 32 are, in one example, solder balls comprised of about 63% tin and 37% lead by weight, and have a relatively low melting point temperature compared to electrical conductors 28.

The embodiment of the invention shown in FIG. 1 may also include a second integrated circuit 26, in one example a driver die that is substantially planar. A plurality of third electrical conductors 30 are placed on second integrated circuit 26. The plurality of third electrical conductors 30 are, in one example, solder balls comprised of about 10% tin and 90% lead by weight, and have a relatively high melting point temperature, like those of integrated circuit 24. Using flip-chip soldering technology, third electrical conductors 30 are reflowed, and second integrated circuit 26 is electrically connected to circuitry 22 on second opposing surface 15. After soldering has been performed, second integrated circuit 26 is oriented in such a manner as to be substantially parallel to second opposing surface 15.

Circuitized substrate 34 may be, in one example comprised of organic material, and in another example comprised of ceramic material. Substrate 34 has circuitry 36 formed on it using, in one example, a conventional photolithography process. In a preferred embodiment, substrate 34 is a conventional printed circuit board. Circuitry 36 is formed in a pattern on substrate 34 so as to correspond to the pattern of second electrical conductors 32 on coupler 10. Coupler 10 is placed on circuitized substrate 34 such that second electrical conductors 32 are aligned with circuitry 36 on the substrate. Second electrical conductors 32 are then reflowed so as to electrically connect coupler 10 with circuitry 36, completing assembly of the coupler onto substrate 34.

Figure 2:
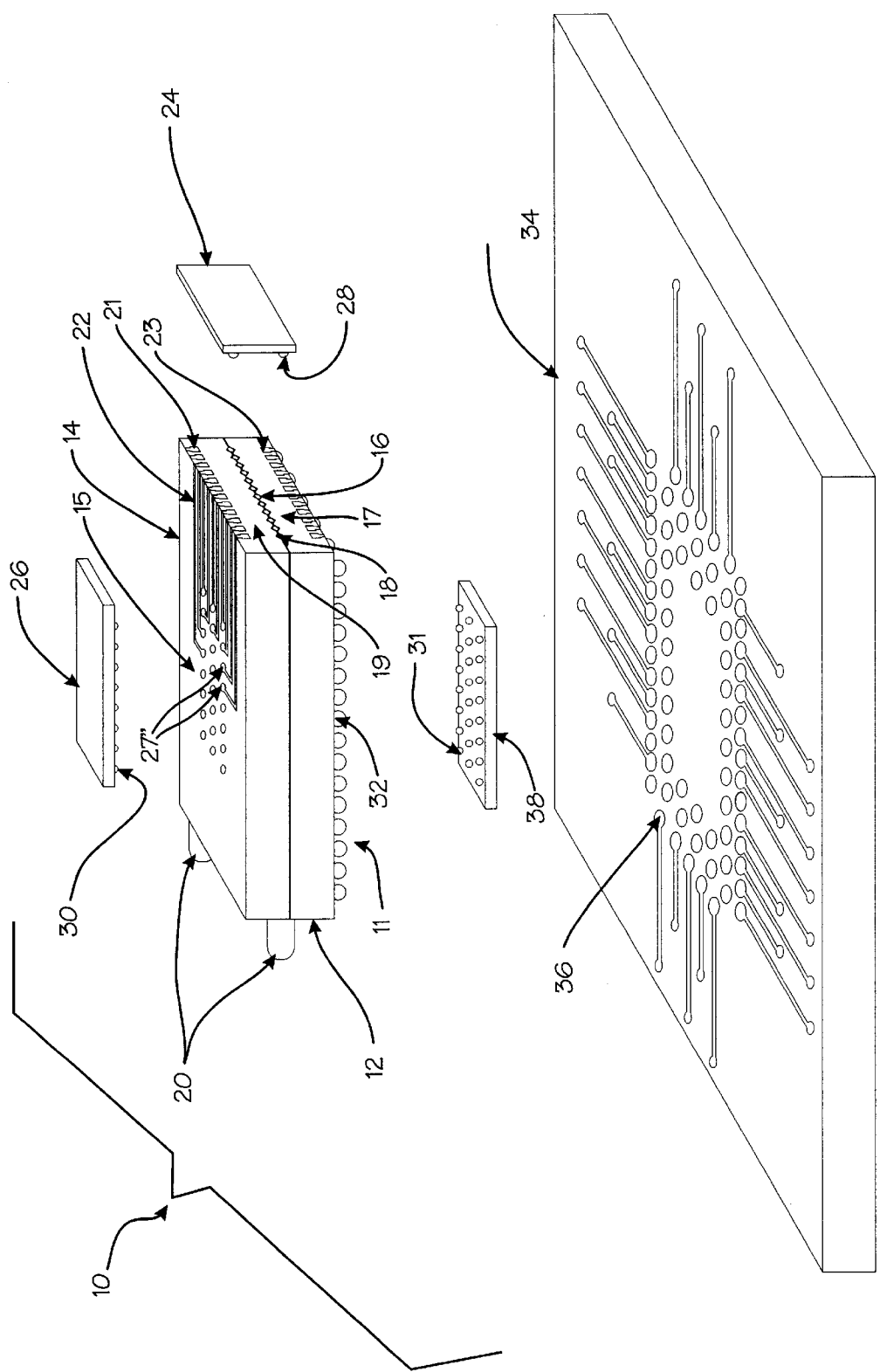
FIG. 2 is an exploded perspective view of an optical coupler according to another embodiment of the invention.

In FIG. 2, there is shown a further embodiment of the invention. FIG. 2 is similar to FIG. 1 with the addition of a third integrated circuit 38, in one example a driver die that is substantially planar, on first part 12 of housing 11. A plurality of fourth electrical conductors 31 are placed on third integrated circuit 38. The plurality of fourth electrical conductors 31 are, in one example, solder balls comprised of about 10% tin and 90% lead by weight, and have a relatively high melting point temperature, like those of integrated circuits 24 and 26. Using flip-chip soldering technology, fourth electrical conductors 31 are reflowed, and third integrated circuit 38 electrically connected to circuitry 25 on first opposing surface 13. Significantly, the plurality of second electrical conductors 32 are of a sufficiently large size so as to provide sufficient clearance for the plurality of smaller fourth electrical conductors 31 and relatively thin third integrated circuit 38 between first part 12 of housing 11 and underlying circuitized substrate 34.

Figure 3:
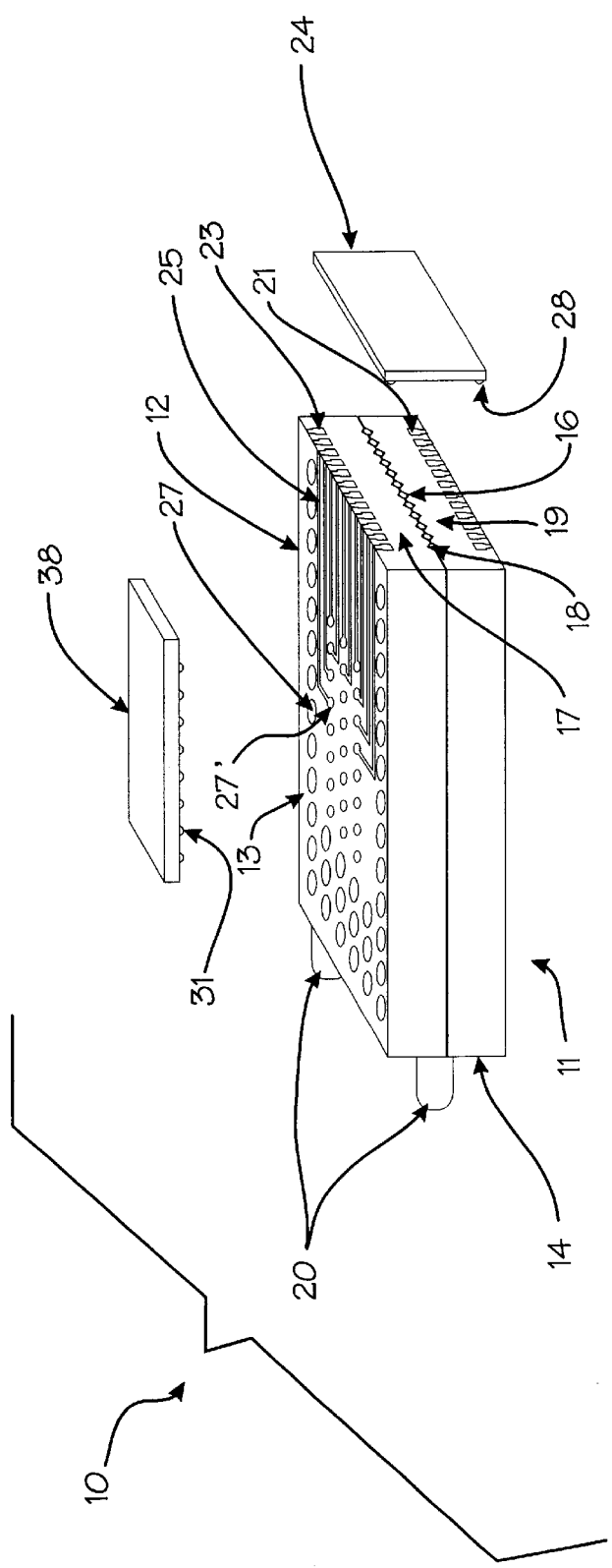
FIG. 3 is an exploded perspective view of an optical coupler according to another embodiment of the invention.

In FIG. 3, there is shown an inverted view of coupler 10. FIG. 3 serves the purpose of showing first opposing surface 13 of first part 12 of housing 11 that is not shown in the other FIGS. The plurality of fourth electrical conductors 31 are placed on third integrated circuit 38. Using flip-chip soldering technology, the plurality of fourth electrical conductors 31 are reflowed, and third integrated circuit 38 electrically connected to circuitry 25 on first opposing surface 13. As stated above, circuitry 25 on first opposing surface 13 includes circuit pads 27. Circuit pads 27 are formed on first opposing surface 13 so as to correspond to circuitry 36 on circuitized substrate 34. The plurality of second electrical conductors 32 are then placed on circuit pads 27 and housing 11 is placed on substrate 34 such that second electrical conductors 32 are aligned with circuitry 36. The plurality of second electrical conductors 32 are reflowed so as to electrically connect housing 11 with circuitry 36. In a preferred embodiment, third electrical conductors 30 and fourth electrical conductors 31, if used, are reflowed prior to first electrical conductors 28 so as to not adversely affect the alignment of integrated circuit 24 and optical fibers 18 as heating and cooling used in subsequent reflow operations may affect this alignment. Reflowing of second electrical conductors 32 preferably occurs after the above reflow operations as conductors 32 preferably have a relatively low melting point temperature as compared with conductors 28, 30 and 31.

In an alternative embodiment, it is possible to use just integrated circuit 38 in combination with integrated circuit 24, and not use integrated circuit 26. Understandably, in accordance with the teachings herein, coupler 10 needs only integrated circuit 24 to provide the optical-electrical coupling between optical fibers 18 and circuitry 36.

Figure 4:
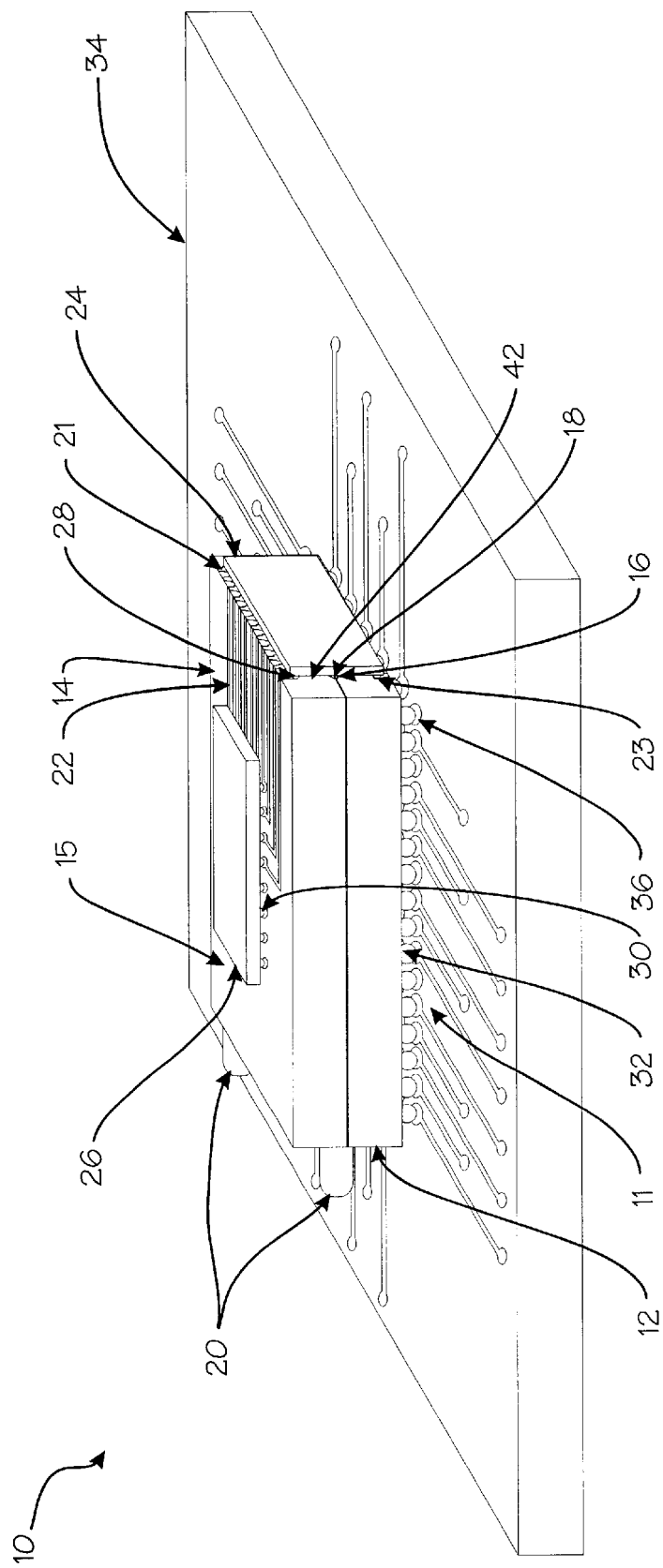
FIG. 4 is a perspective view of an assembled optical coupler embodiment coupled to a circuitized substrate.

In FIG. 4, there is shown an assembled view of the optical coupler 10 (Note that the housing is inverted from the FIG. 3 embodiment and thus similar to the embodiments of FIGS. 1 and 2). FIG. 4 shows an embodiment of the invention that has the aforementioned second integrated circuit 26. After the reflow of the plurality of second electrical conductors 32 is completed to bond coupler 10 to circuitized substrate 34, a clear epoxy (not shown) is used to underfill gap 42 between housing 11 and integrated circuit 24. The clear epoxy is used to improve the performance of light transmission to and from integrated circuit 24. The clear epoxy reduces the attenuation of light that would normally occur at the interfaces between optical fibers 18 and corresponding light-sensing and/or light-emitting areas 110 on integrated circuit 24. The clear epoxy also protects the ends of optical fibers 18 as well as areas 110.

Figure 5:
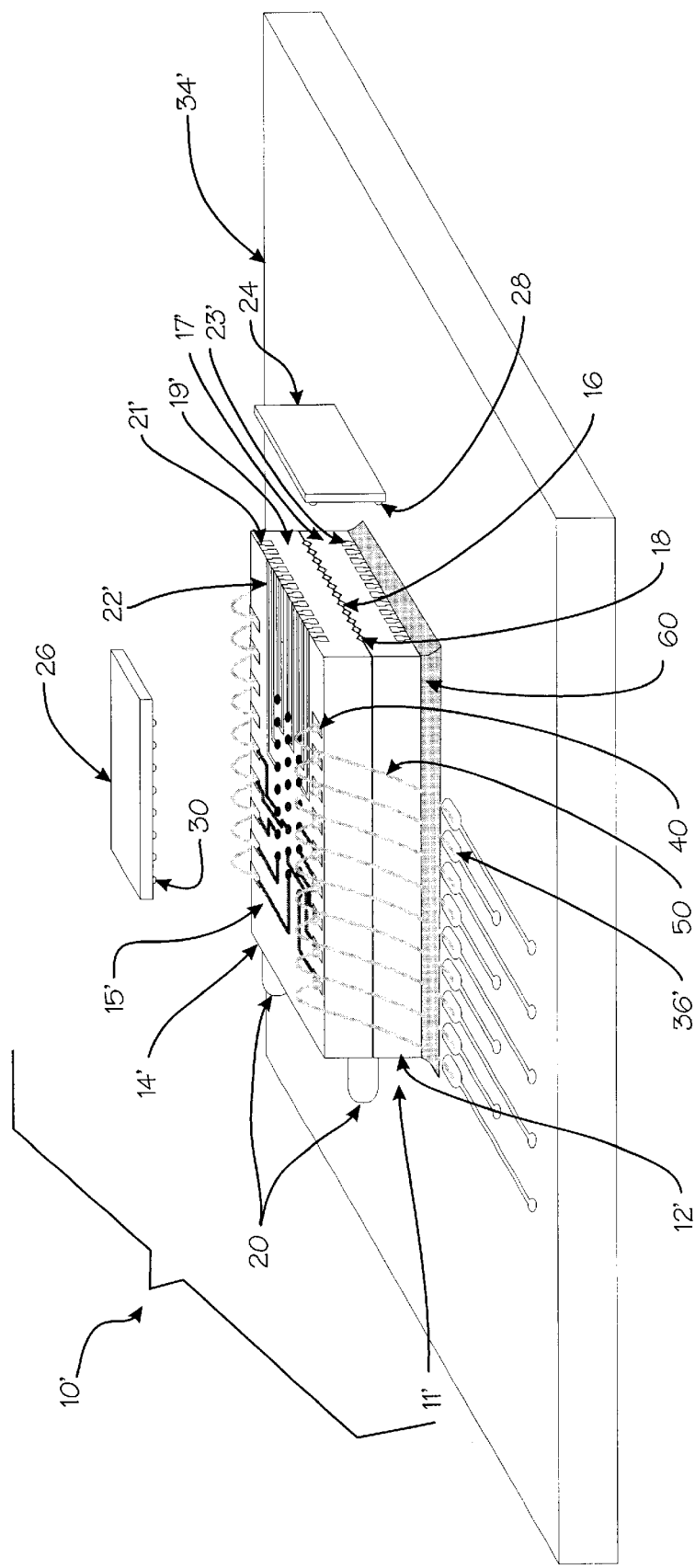
FIG. 5 is an exploded perspective view of an optical coupler according to another embodiment of the invention.

In FIG. 5, there is shown an embodiment of an optical coupler 10' according to another aspect of the invention. A primary difference of this embodiment over optical coupler 10 is that wirebonds 50 may be used to electrically connect housing 11' to a circuitized substrate as opposed to solder balls. Like coupler 10 above, optical coupler 10' comprises a housing 11', optical fibers 18, end circuitry 21' and 23' and at least one integrated circuit 24 positioned on or within housing 11' that is electrically connected to end circuitry 21' and 23' using electrical conductors such as those referenced by the numeral 28 in the above embodiment. (The same numeral is thus used here.) The optical fibers 18 are aligned relative to integrated circuit 24, similarly to the FIG. 1 embodiment. The housing 11' comprises a first part 12' and a second part 14', at least the first part 12' having at least one groove 16 for each fiber. The housing also preferably includes alignment pin grooves similar to those shown in FIG. 8. Circuitry 21' and 23' is formed on housing surfaces 19' and 17', respectively, using, in one example, a doping process, as performed above in the FIG. 1 embodiment. In fact, coupler 10' is preferably formed using the same materials and processes described hereinabove with respect 10 to coupler 10. Further description of such materials and processes is not believed necessary.

The first opposing surface (not shown) of the housing's first part 12' is attached to circuitized substrate 34' using adhesive 60. Circuitry 22', if used (see below), is formed on surface 15' and includes circuit pads 40. Circuitry 22', circuit pads 40 and circuitry 21' are understood to be electrically connected. Circuitry 22' is used, if it is desirable, in FIG. 5 to also use a second integrated circuit 26, as in the aforedefined embodiment. Pads 40 are used as bonding sites for the individual wirebonds 50, and if pads 40 are electrically coupled to the circuitry under integrated circuit 26, serve to directly couple wirebonds 50 to this second integrated circuit as well as integrated circuit 24.

A plurality of optical fibers are positioned in respective grooves 16, and alignment pins 20 positioned in respective alignment pin grooves, as was done for the FIG. 1 embodiment. Second part 14' of housing 11' is placed on first part 12' to secure and align optical fibers 18 (and the alignment pins). First part 12' and second part 14' are held together using an adhesive (not shown), as also done above. Integrated circuit 24, as described above, is in one example an optical die, and contains a plurality of light-sensing and/or light-emitting areas. Electrical conductors 28 are understandably of the same material cited above.

To assemble the wirebonds, first ends of the wirebonds are secured to circuit pads 40, while second ends are secured to circuitry 36' on circuitized substrate 34'. A conventional wirebonding operation may be used. The circuitry of substrate 34' also includes pads on which the wirebonds are bonded at the second ends thereof. The pads are similar in size to the corresponding pads on the upper part of the housing. The embodiment of the invention shown in FIG. 5 may also include a second integrated circuit 26, in one example a driver die.

Figure 6:
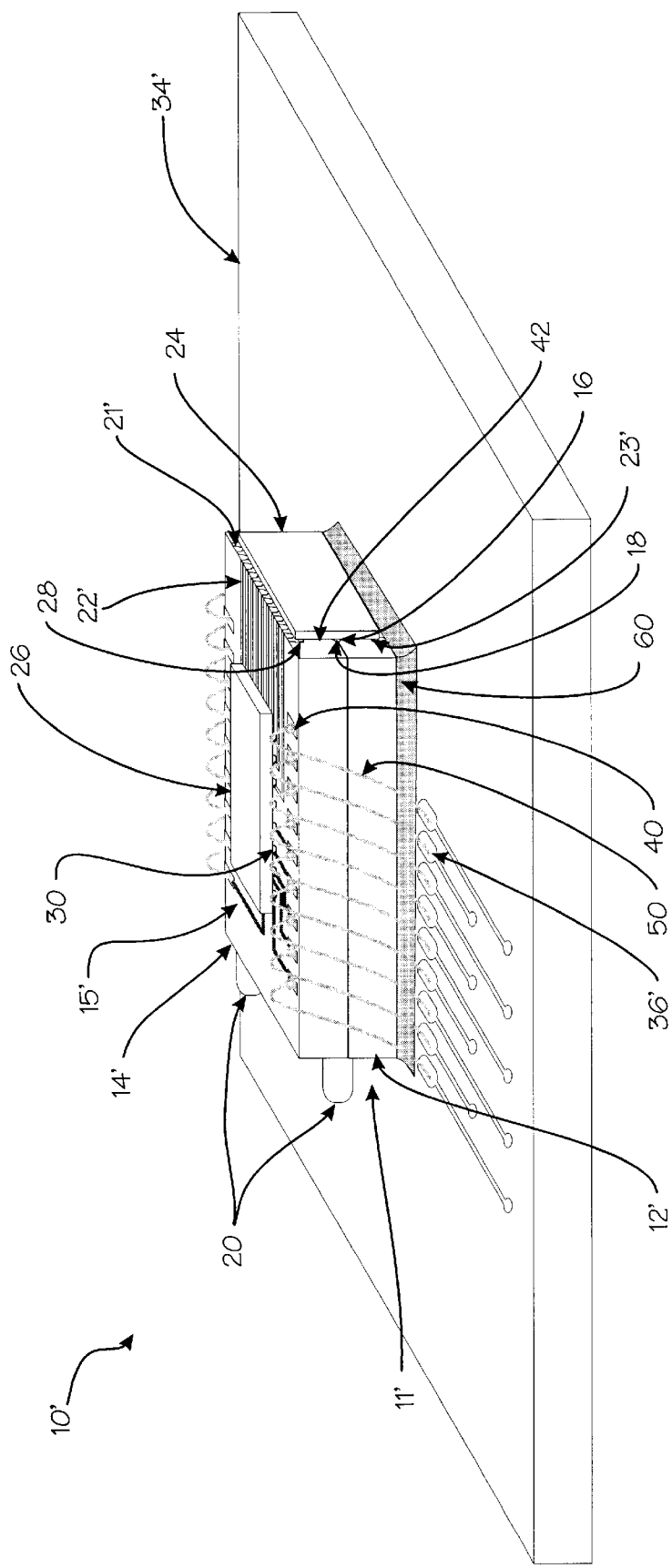
FIG. 6 is a perspective view of the assembled optical coupler of FIG. 5.

In FIG. 6, there is shown an assembled view of the optical coupler 10' of FIG. 5. The embodiment of the invention shown in FIG. 6 is especially preferred in applications where there is a significant mis-match in the coefficients of thermal expansion (CTE) between the housing and the circuitized substrate.

Figure 7:
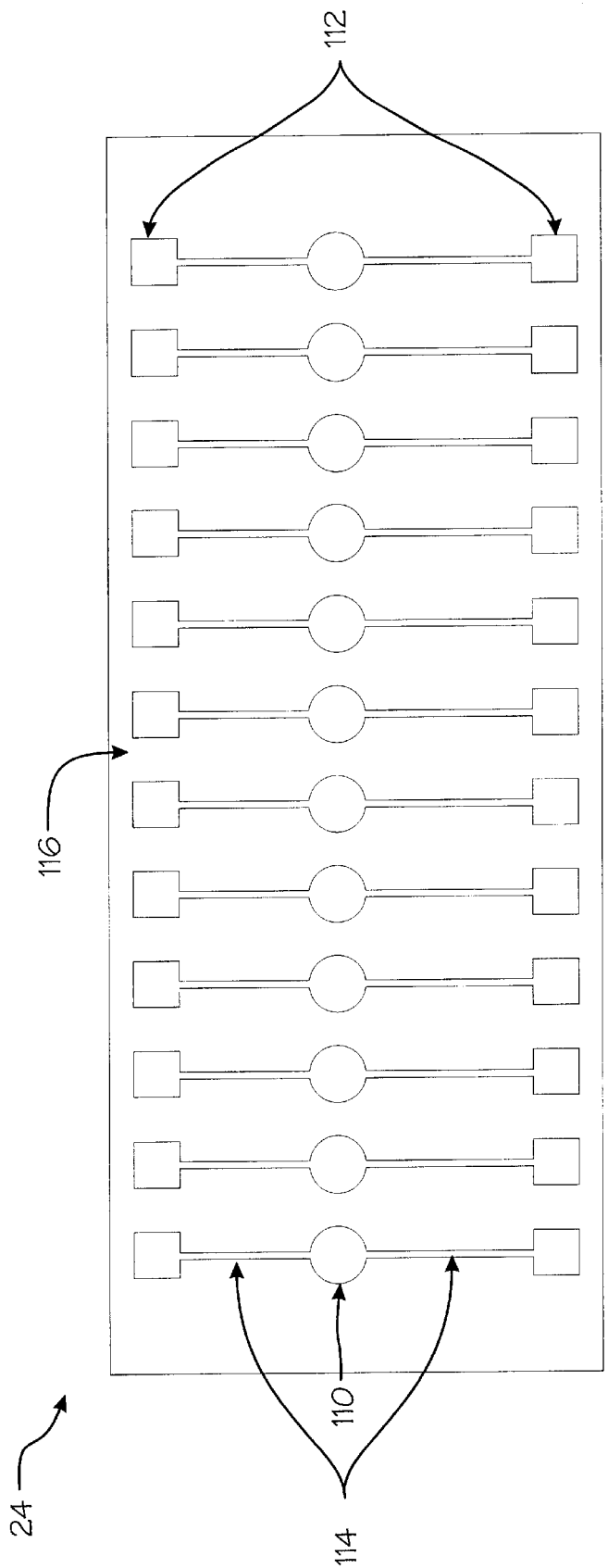
FIG. 7 is a view of the face of an optical die usable in the present invention.

In FIG. 7, as mentioned above, there is shown a view of integrated circuit 24 which shows the face 116 of the integrated circuit. Face 116 contains the aforementioned light-sensing and/or light-emitting areas 110, circuit pads 112 and circuitry 114. Circuitry 114 electrically connects the light-sensing and/or light-emitting areas with circuit pads 112. Light-sensing and/or light-emitting areas 110 are, in one example, comprised of Vertical Cavity Surface Emitting Lasers (VCSEL's) for propagating light transmissions and/or, in another example, photodetectors for receiving light transmissions, or a combination of the two. Circuit pads 112 align with the corresponding circuit pads seen in FIG. 1 as part of circuitry 23 and 21 on the first and second end surfaces of the housing. Circuit pads 112 on integrated circuit 24 and the described circuitry on the housing are formed using a known photo-lithography process which provides for the very precise and accurate location of the circuit pads and circuitry with respect to the corresponding light-sensing and/or light-emitting areas, in addition to the axes of optical fibers 18. This alignment is understandably a significant feature of the present invention because such alignment is very important when considering the relatively small sizes of the individual components (e.g. fibers, grooves, pads, etc.) of this invention. As mentioned, integrated circuit 24 is attached and passively aligned to the housing in a very precise manner. A passive alignment procedure is one in which the light-sensing and/or light-emitting areas 110 on integrated circuit 24 are not electrically activated during the alignment procedure. Significantly, precise alignment of the fibers with respect to ones of the areas 110 is attained to thereby assume optimum light output and/or input in this region of the invention.

In FIG. 8, there is shown a perspective view of the optical coupler of the invention after the housing has been encapsulated within a cover member 124, in one example a plastic overmold. Connector catch 122, which is formed in cover member 124, is used to secure and retain an optical fiber connector 130 which can be plugged into the coupler. Alignment pin grooves 126 secure and align the alignment pins 20 which, in turn, align connector 130 during such connector plugging. Connector 130 contains a plurality of optical fibers 132 (shown in phantom) which correspond to optical fibers 18. Plugging the connector into the housing establishes optical connectivity between fibers 18 and 132.

While there have been shown and described what are at present the preferred embodiments of the invention, it will be obvious to those skilled in the art that various changes and modifications may be made therein without departing from the scope of the invention as defined by the appended claims.

What is claimed is:

1. An optoelectronic assembly comprising:
   a substrate, a plurality of holes within said substrate parallel to a facial surface of said substrate and opening to a side surface of said substrate, a first set of conductive pads on said side surface, a first set of conductors formed on or integral with said side surface leading from the first set of conductive pads, respectively to a side edge of said substrate between said facial surface and said side surface and formed on or integral with said facial surface continuing from said side edge to circuitry on said facial surface of said substrate;
   a plurality of optical transmission elements in said plurality of holes, respectively; and
   an optical chip including a plurality of optical devices, said optical chip having a second set of conductive pads which are flip-chip soldered onto said first set of conductive pads on said side surface of said substrate such that (a) said plurality of optical devices of said optical chip are aligned with the plurality of optical transmission elements, respectively and (b) said optical chip is electrically connected to said first set of conductive pads.

2. An optoelectronic assembly as set forth in claim 1 wherein said optical transmission elements are optical fibers.

3. An optoelectronic assembly as set forth in claim 1 further comprising an electronic driver and/or receiver chip mounted on said facial surface of said substrate an electrically connected to said first set of conductors to provide electrical signals to and/or receive electrical signals from said optical chip.

4. An optoelectronic assembly as set forth in claim 3 further comprising:
   a second electronic driver and/or receiver chip mounted on a second facial surface of said substrate opposite the first said facial surface of said substrate; and
   a third set of conductive pads on said side surface, a second set of conductors formed on or integral with said side surface leading from said third set of conductive pads, respectively to a side edge of said substrate between said second facial surface and said side surface and formed on or integral with said second facial surface continuing from said side edge to connect said third set of pads to said second electronic driver and/or receiver chip so that said second electronic driver and/or receiver chip can provide electrical signals to and/or receive electrical signals from said optical chip.

5. An optoelectronic assembly as set forth in claim 1 further comprising a third set of conductive pads on said facial surface, and wherein:
   said first set of conductors is electrically connected to said third set of pads, respectively, and
   said electronic driver and/or receiver chip includes a fourth set of pads, said fourth set of pads being flip-chip mounted to said third set of pads on said facial surface.

6. An optoelectronic assembly as set forth in claim 1 wherein said substrate comprises two sections, each of said sections having a plurality of grooves on adjacent facial surface, said adjacent facial surfaces being bonded to each other such that the plurality of grooves of one of said sections is aligned with the plurality of grooves of the other of said sections to form said plurality of holes in said substrate.

7. An optoelectronic assembly as set forth in claim 6 wherein each of said grooves is V-shaped, a wider portion of each groove being at said adjacent facial surface.

8. An optoelectronic assembly as set forth in claim 1 further comprising a plurality of alignment pins mounted in said substrate parallel to said holes, said alignment pins protruding from said substrate to enable alignment of said optical transmission elements with another optical device.

9. An optoelectronic assembly as set forth in claim 1 wherein said optical devices are VCSELs.

10. An optoelectronic assembly as set forth in claim 1 wherein said substrate is made of a semiconductor material, and said first set of conductors are formed by doping said semiconductor material.

11. An optoelectronic assembly comprising:
    a substrate, a plurality of holes within said substrate parallel to a facial surface of said substrate and opening to a side surface of said substrate;
    a plurality of optical transmission elements in said plurality of holes, respectively;
    an optical chip including a plurality of optical devices, said optical chip being bonded to said side surface of said substrate such that said plurality of optical devices of said optical chip are aligned with the plurality of optical transmission elements, respectively; and wherein
    said substrate comprises two planar sections, said planar sections having a plurality of grooves on adjacent facial surfaces, said adjacent facial surfaces being bonded to each other such that the plurality of grooves of one of said sections is aligned with the plurality of grooves of the other of said sections to form said plurality of holes in said substrate.

12. An optoelectronic assembly as set forth in claim 11 wherein said optical transmission elements are optical fibers.

13. An optoelectronic assembly as set forth in claim 11 wherein said optical device includes a first set of conductive pads, further comprising a second, respective set of conductive pads on said side surface, and wherein said first set of conductive pads are soldered to said second set of conductive pads, respectively.

14. An optoelectronic assembly as set forth in claim 11 wherein each of said grooves is V-shaped, a wide portion of each groove being at said second surface.

15. An optoelectronic assembly as set forth in claim 11 wherein said optical devices are VCSELs.

16. An optoelectronic assembly as set forth in claim 11 wherein said substrate is made of a semiconductor material.

17. An optoelectronic assembly comprising:
    a substrate, a plurality of holes within said substrate parallel to a facial surface of said substrate and opening to a side surface of said substrate, a first set of conductive pads on said facial surface, a first set of conductors formed on or integral with said substrate, said first set of conductors interconnecting said first set of conductive pads to circuitry on said substrate;

a plurality of optical transmission elements in said plurality of holes, respectively;

an optical chip including a plurality of optical devices, said optical chip being bonded to said side surface of said substrate such that said plurality of optical devices are aligned with a respective plurality of said optical transmission elements; and a planar printed circuit board having a second set of conductive pads on a facial surface of said printed circuit board, said printed circuit board including circuitry electrically connected to said second set of conductive pads, said first set of conductive pads of said substrate being solderd to said second set of conductive pads of said printed circuit board.

18. An optoelectronic assembly as set forth in claim 17 wherein said substrate comprises two sections, said sections having a plurality of grooves on adjacent facial surfaces thereof, said adjacent facial surfaces being bonded to each other such that the plurality of grooves of one of said sections is aligned with the plurality of grooves of the other of said sections to form said plurality of holes in said substrate.

19. An optoelectronic assembly as set forth in claim 17 wherein said optical transmission elements are optical fibers.

20. An optoelectronic assembly as set forth in claim 17 wherein said optical device includes a third set of conductive pads, further comprising a fourth, respective set of conductive pads on said side surface, and wherein said optical device is bonded to said side surface by solder between said third set of conductive pads and said fourth set of conductive pads, respectively.

21. An optoelectronic assembly as set forth in claim 17 wherein said optical devices are VCSELs.

22. An optoelectronic assembly as set forth in claim 17 wherein said circuitry on said substrate comprises an electronic driver and/or receiver chip to provide electrical signals to and/or receive electrical signals from said optical chip.

23. An optoelectronic assembly as set forth in claim 17 wherein said substrate is made of a semiconductor material and said first set of conductors are formed by doping said semiconductor material.

* * * * *